(12) United States Patent
Berghmans et al.

(10) Patent No.: US 6,528,570 B1
(45) Date of Patent: Mar. 4, 2003

(54) POLYMER PARTICLES

(75) Inventors: Michel Florentine Jozef Berghmans, Dordrecht (NL); Carolus Matthias Anna Maria Mesters, Alkmaar (NL); Alphonsus Catharina Gerardus Metsaars, Rijen (NL); Eric Wilhelmus Johannes Frederik Neijman, Waalwijk (NL); Ján Pallay, Kessel-Lo (BE)

(73) Assignee: Nova Chemicals (International) S.A. (CH)

( * ) Notice: Subject to any disclaimer, the term of this patent is extended or adjusted under 35 U.S.C. 154(b) by 0 days.

(21) Appl. No.: 09/619,197

(22) Filed: Jul. 19, 2000

(30) Foreign Application Priority Data

Jul. 26, 1999 (EP) .............................. 99202459

(51) Int. Cl.⁷ ................................. C08K 3/34
(52) U.S. Cl. ................. 524/444; 523/218; 524/445; 524/492; 524/493
(58) Field of Search ................ 523/218; 524/444, 524/445, 492, 493

(56) References Cited

U.S. PATENT DOCUMENTS

| | | | | |
|---|---|---|---|---|
| 3,951,859 A | * | 4/1976 | Inaba | 252/340 |
| 4,130,512 A | * | 12/1978 | Streat | 521/31 |
| 4,287,258 A | * | 9/1981 | Hahn | 428/407 |
| 4,802,985 A | * | 2/1989 | Sugimori | 210/502.1 |
| 4,833,060 A | * | 5/1989 | Nair | 430/137 |
| 5,358,719 A | * | 10/1994 | Mellul | 424/497 |
| 5,792,816 A | * | 8/1998 | Abend | 525/327.4 |
| 5,950,702 A | * | 9/1999 | Tan | 164/34 |
| 5,985,943 A | * | 11/1999 | Hahn | 521/57 |

FOREIGN PATENT DOCUMENTS

| | | |
|---|---|---|
| DE | 19610330 A1 | 9/1997 |
| DE | 19812856 A1 | 9/1999 |
| EP | 0305137 | 10/1995 |
| EP | 0391499 | 7/1996 |
| EP | 0403023 | 4/1997 |
| GB | 409285 | 4/1934 |
| WO | WO 99/48957 | 9/1999 |

* cited by examiner

*Primary Examiner*—Edward J. Cain
(74) *Attorney, Agent, or Firm*—Kenneth H. Johnson

(57) ABSTRACT

Polymer particles containing a polymer of a vinylarene monomer, a porous silicate compound and at least 1.5% by weight of water, based on the weight of vinylarene, water and porous silicate compound, wherein the porous silicate compound is selected from alumino silicates and amorphous silica particles, and a process for the preparation of such polymer particles.

11 Claims, No Drawings

POLYMER PARTICLES

FIELD OF THE INVENTION

The present invention relates to polymer particles containing a polymer of a vinylarene monomer and a foaming agent and to a process for their preparation.

Particles that contain a polymer of a vinylarene monomer and a foaming agent are generally known as expandable polymers. A well-known expandable polymer is expandable polystyrene. Expandable polystyrene is produced on a commercial scale by suspension polymerization. The foaming agent is usually a low-boiling hydrocarbon, such as a $C_{3-6}$ hydrocarbon, in particular pentane. The expandable polystyrene is used for making foamed articles that are produced by expanding the polystyrene particles. In the expansion process the foaming agent is (partially) released and may be emitted into the environment. Such emissions are regarded undesirable and ways are sought to reduce the amount of hydrocarbon foaming agent.

BACKGROUND OF THE INVENTION

In DE 196 10 330 the use of zeolites in polymer foams, such as polystyrene foams, is disclosed. Herein, zeolite is added to the molten polymer. The resulting mixture is heated to cause the crystal water of the zeolite to evaporate, thereby creating little gas nuclei. These nuclei serve to collect hydrocarbon foaming agent that is added to the composition. The actual expansion thus still requires the presence of a hydrocarbon foaming agent.

It was an object of the present invention to obtain expandable polymer particles containing a polymer of a vinylarene monomer, in which the amount of water that can be used as foaming agent is such that one may refrain from incorporating any amount of hydrocarbon foaming agent.

Surprisingly, it was found that this object can be achieved by a polymer particle, containing a porous silicate compound, which polymer particle contains at least 1.5% by weight of water.

SUMMARY OF THE INVENTION

Accordingly, the present invention relates to polymer particles containing a polymer of a vinylarene monomer, a porous silicate compound and at least 1.5% by weight of water, based on the weight of vinylarene, water and porous silicate compound, wherein the porous silicate compound is selected from alumino silicates and amorphous silica particles.

Polymer particles according to the present invention have satisfactory expandability properties without the need to contain an organic foaming agent. They can be expanded to yield pre-expanded particles, which are optionally treated further to obtain foamed articles.

Suitable vinylarene monomers to be used in the present process are well known in the art and can suitably be selected from styrene, α-methylstyrene, chlorostyrene, dimethylstyrene, vinyltoluene and similar styrenic derivatives. Preferably, the vinylarene is styrene, optionally mixed with at most 50 weight % of any other vinylarene, based on the total amount of vinylarene incorporated in the final polymer. Most preferably, styrene is used as the sole monomer.

The porous silicate compound is selected from alumino silicates and amorphous silica particles.

Examples of alumino silicates are clays and zeolites. Clays are hydrated alumino silicates of the generalized formula $Al_2O_3.SiO_2.H_2O$. Examples are kaolinite, montmorillonite and bentonite.

Zeolites are substances well known in the art. Reference is made to e.g. D. W. Breck "zeolite molecular sieves", which contains extensive background on zeolites. The term "alumino silicate zeolite" is used to indicate a collection of crystalline, hydrated alumino silicates with small, uniform pores and a big inner surface. The empirical formula of these zeolites is $M_{2/n}O.Al_2O_3.xSiO_2.yH_2O$, wherein M is a cation, n is the cation valency, and x and y are the amount of respectively $SiO_2$ and crystal water molecules. Suitably, M is selected from group I or II elements in particular sodium, potassium, magnesium, calcium, strontium and barium. M may also be selected from ammonium, alkylammonium or hydrogen cations.

BEST MODE

In the present invention, it is preferred to use alumino silicate zeolites having a Si/Al molar ratio of 1 to 30, preferably from 1 to 4. Particularly good results have been obtained with zeolite A wherein part of the sodium cations have been exchanged for calcium cations. Further good results have been obtained with zeolite Y in which part of the sodium cations have been exchanged by ammonium cations.

The porous silicate compound may also be an amorphous silica particle. Such compounds are suitably built from more than 95% by weight of $SiO_2$, more suitably from more than 98% by weight. Examples are compounds sold under the trade name "SIPERNAT" or "AEROSIL" by Degussa. Good results have been obtained with silica compounds having the trade name "SIPERNAT 50" and "SIPERNAT 50 S". They both contain 98.5% by weight $SiO_2$, based on the substance which has been dried for 2 hours at 2000° C. Also good results are obtained with "AEROSIL 200", which contains more than 99.8% by weight $SiO_2$, based on the substance which has been dried for 2 hours at 2000° C. (AEROSIL is a trademark).

The average particle size of the porous silicate compound is thought to have an effect on the cell size and cell size distribution of the pre-expanded polymer particles and resulting foam. In this patent document, the average particle size is understood to be the value at which 50 volume % of the particles have a smaller particle size and 50 volume % of the particles have a bigger particle size, as measured by laser light diffraction using a Malvern Mastersizer Microplus apparatus. It is preferred to use a porous silicate compound having an average particle size of 50 μm or less, preferably from 0.1 μm to 40 μm, more preferably from 0.5 μm to 20 μm. The use of porous silicate compounds having an average particle size between the cited ranges results in foams having an improved strength, improved fusion and less shrinkage.

The porous silicate compound should be present in the polymer particles of the current invention in an amount capable of adsorbing at least 1.5% by weight of water. Typically, the amount used is from 0.1 to 10% by weight, based on the weight of vinylarene, water and porous silicate compound. Preferably, the amount is from 0.5 to 5% by weight. If the amount of porous silicate compound is too low, the water-adsorbing capacity of the resultant particle may remain unsatisfactorily low. If the amount is too high, the mechanical properties of the foamed article, made from the resultant particles, may be adversely affected.

The amount of water present in the polymer particles of the current invention is at least 1.5% by weight, based on the weight of the vinylarene, water and porous silicate compound, as measured in accordance with the Karl Fischer method. Preferably, the amount is from 2 to 20% by weight, more preferably from 3 to 11% by weight. Such particles are expandable without the presence of a $C_{3-6}$ hydrocarbon foaming agent. This makes that the particles can contain less than 0.5% weight of a $C_{3-6}$ hydrocarbon, more preferably less than 0.25% weight, based on weight of the particle. Most preferably, the particles do not contain any $C_{3-6}$ hydrocarbon.

It will be appreciated that polymer particles according to the invention may further contain several additives or coatings in effective amounts. Such additives include dyes, fillers, stabilizers, flame retarding compounds, nucleating agents, anti-static compounds and lubricants. Of particular interest are coating compositions containing glycerol or metal carboxylates. Such compounds reduce the tendency of the particles to agglomerate. Suitable carboxylates are glycerol mono-, di- and/or tristearate and zinc stearate Examples for such additive compositions are disclosed in GB-A-1,409,285. The coating compositions are deposited onto the particles via known methods, e.g., via dry-coating in a ribbon blender or via a slurry or solution in a readily vaporizing liquid.

The particles advantageously have an average diameter of 0.1 to 6 mm, preferably from 0.4 to 3 mm.

In addition to the polymer particle per se, the present invention also relates to a process for the preparation of such polymer particles containing a polymer of a vinylarene monomer, which process includes:

(a) preparing a viscous mass containing 10–70% by weight, based on the total amount of vinylarene present, of a polymer of a vinylarene monomer, 90–30% by weight, based on the total amount of vinylarene present, of a vinylarene monomer, and a porous silicate compound;

(b) suspending the viscous mass thus obtained into an aqueous medium to yield suspended particles; and (c) polymerizing the suspended particles to complete monomer conversion.

Step (a) may be conducted in any known manner. One possible way could be mixing the components of step (a) in an extruder or another kind of mixer. However, it is preferred to obtain the viscous mass of step (a) by pre-polymerization of vinylarene monomers to a conversion degree of 10 to 70% by weight, based on the weight of the vinylarene monomer present at the start of the polymerization, and adding the porous silicate compound before, during or after the pre-polymerization to the polymerization mixture.

It is preferred to add a compound to the viscous mass that enhances the incorporation of porous silicate compound. If the viscous mass is obtained by pre-polymerization, the extra compound is suitably added at the start of the pre-polymerization. Suitable compounds may be metal persulphates such as potassium persulphate. Metal persulphates are suitably added in an amount of 100–150 ppm, based on the amount of vinylarene. Alternatively, an unsaturated compound containing polar groups may be added. Examples are maleic anhydride, unsaturated mono acids such as acrylic acid or methacrylic acid, or salts of an ester thereof or divinylbenzene. These compounds may optionally be further substituted with e.g. siloxane groups. They are used in an amount of 0.1 to 2% by weight, more preferably 0.5 to 2% by weight, based on vinylarene. The use of maleic anhydride is preferred.

The pre-polymerization step may be conducted in any known manner. This includes anionic polymerization, free-radical polymerization and thermal polymerization. The degree of monomer conversion can easily be controlled in thermal polymerization by increasing or decreasing the temperature. Therefore, thermal polymerization is preferred for the pre-polymerization step. Preferably, the thermal polymerization is effected by heating the solution to a temperature of 60 to 180° C., preferably from 110 to 1 30° C. When the desired conversion has been achieved the temperature is reduced and the polymerization stops. It is most preferred to carry out the pre-polymerization step by thermal polymerization in the presence of a relatively small amount of free-radical initiator. A suitable amount is between 0.005 and 0.20% by weight of initiator, based on amount of vinylarene. It has been found that the presence of the small amount of initiator gives polymer particles of increased expandability.

Optimal conversion degrees of the pre-polymerization may vary if different porous silicate compounds are used. Preferably, the conversion degree is from 10 to 70% of the vinylarene monomer, more preferably from 20 to 50%, most preferably from 25 to 40%. It is believed that due to the pre-polymerization the mobility of the porous silicate compound in the pre-polymerized mass is reduced, thereby facilitating a fine distribution of the compound in the pre-polymerized mass. It is believed that by this fine distribution the water-uptake in the form of minute droplets is favored.

Subsequent to its preparation, the viscous mass is suspended in an aqueous medium. The volume ratio between the aqueous medium and the pre-polymerized mass may vary between wide ranges, as will be appreciated by a person skilled in the art. Suitable volume ratios include 1:1 to 1:5 (pre-polymerized mass:aqueous phase). The optimal ratio is determined by economic considerations. During the suspension step (b) and polymerization step (c) water is incorporated into the viscous mass.

The aqueous medium suitably contains one or more conventional suspension stabilizers. Suitable suspension stabilizers are well known in the art and comprise poly(vinyl alcohol), gelatine, agar, polyvinyl pyrrolidine, polyacrylamide, inorganic stabilizers such as alumina, bentonite, or phosphates, like tricalciumphosphate and/or disodium hydrogen phosphate, optionally in combination with any of the stabilizing compounds mentioned earlier. The amount of stabilizer may suitably vary from 0.1 to 0.9% weight, based on the weight of the aqueous phase. Any polymeric stabilizing agent, e.g. polyvinyl pyrrolidone or hydroxyethyl cellulose, is essentially not taken up by the suspended pre-polymerized mass.

During the suspension polymerization step (c), it may be advantageous to have a pH of the aqueous phase which is above 7, as measured at the temperature prevailing in the polymerization mixture. In such cases, it might be desirable to add a buffering substance to adjust and maintain the pH above 7. The skilled person will appreciate which buffering compounds can be used. Suitably, a buffering amount of calcium hydroxide is added to the suspended polymerization mixture.

The polymerization step (c) is advantageously effected by free-radical polymerization by means of a free-radical initiator. Thermal polymerization is less preferred as it would need to be carried out at elevated pressure in view of the water present.

The free-radical initiators can be selected from conventional initiators for free-radical polymerization. They include in particular organic peroxy compounds, such as peroxides, peroxy carbonates and peresters. Typical examples of these peroxy compounds are $C_{6-20}$ acyl peroxides, such as decanoyl peroxide, benzoyl peroxide, octanoyl peroxide, stearyl peroxide, peresters, such as t-butyl perbenzoate, t-butyl peracetate, t-butyl perisobutyrate, t-butyl(2-ethylhexyl)peroxycarbonate, hydroperoxides and dihydrocarbyl peroxides, such as those containing $C_{3-10}$ hydrocarbyl moieties, including di-isopropyl benzene hydroperoxide, di-t-butyl peroxide, dicumylperoxide or combinations thereof. Other initiators different from peroxy compounds are also possible, e.g., α,α'-azobisisobutyronitrile. The amount of radical initiator is suitably from 0.01 to 5% weight, based on the weight of the vinylarene monomer. The process is suitably initiated by heating the reaction mixture to elevated temperature, e.g. in the range of 60 to 140° C.

The polymerization process of the step (c) may suitably be carried out in the presence of a chain transfer agent. The person skilled in the art will appreciate that these chain transfer agents can be selected from mercaptans, such as $C_{2-15}$ alkyl mercaptans, e.g. n-dodecylmercaptan, t-dodecylmercaptan, n-butylmercaptan or t-butylmercaptan. Preferred are aromatic compounds such as pentaphenylethane, and in particular the dimer of α-methylstyrene.

The free radical polymerization is suitably carried out at a temperature of 60 to 140° C., preferably 80 to 120° C., and a pressure of 0.3 to 6.0 bar, preferably 2.5 to 4.0 bar.

It may be advantageous to polymerize the vinylarene monomers in the presence of other polymers such as polyphenylene oxide or elastomeric polymers. These other polymers may be added before or during step (a) and/or before, during or after step (c). Suitable polyphenylene oxides have been described in EP-A-350137, EP-A-403023 and EP-A-391499 (incorporated herein by reference). The polyphenylene oxide is preferably present in an amount of between 1 and 30 weight %, based on the amount of vinylarene monomers, and may improve the rigidity of the polyvinylarene polymer particles. Examples of suitable elastomeric polymers have also been described in EP-A-350137 and comprise (block) copolymers of vinyl substituted aromatic monomer and a conjugated diene monomer. These elastomeric polymers are preferably present in an amount of 0.5 to 10 weight %, based on the amount of vinylarene monomers, and may improve the impact strength of the polyvinylarene polymer particles.

The expandable particles can be pre-foamed by conventional methods, e.g. by using of superheated steam, hot air, heating in oil, or by microwaves to yield particles having a reduced density, e.g. from 15 to 140 kg/m³. It is preferred to pre-foam the particles according to the present invention by using a high frequency electric field.

The pre-foamed articles can be further converted into foamed articles in any conventional way.

The present invention also relates to foamed articles obtainable by the polymer particles according to the present invention.

The invention is now illustrated by the following examples.

EXAMPLE 1

An experiment was carried out using zeolite A as porous silicate compound, wherein part of the sodium ions were replaced by calcium ions (hereafter referred to as zeolite Ca-A). The Si/Al ratio of this zeolite was 1. The average particle size of the zeolite was 19 μm, as measured with laser light diffraction, using a Malvern Mastersizer Microplus.

Styrene (80 g), maleic anhydride (0.5% weight based on styrene in 5 g styrene) and zeolite Ca-A were stirred under nitrogen at room temperature in concentrations as set out in Table 1. By heating of the mixture to 120° C. in 15 minutes and maintaining this temperature for 150 minutes, styrene is converted by thermal polymerization. Subsequently, the reaction mixture was cooled to 70° C. within 30 minutes. The styrene conversion was about 39%. A solution of 0.4% weight, based on styrene, dibenzoyl peroxide, and 0.2% weight, based on styrene, t-butyl perbenzoate in 5 g styrene was added and the mixture was homogenized at 70° C. The mixture was subsequently dispersed in 500 g water with 0.08% weight, based on water, hydroxyethyl cellulose and 0.45% weight, based on water, tricalcium phosphate. The suspension was heated for 240 minutes at 80° C., 60 minutes at 90° C. and 120 minutes at 120° C. to yield complete styrene polymerization.

The resulting beads had a water content as given in Table 1, as measured in accordance with the Karl Fischer method.

Beads, having a density of about 1050 g/dm³, were exposed to high frequency electric heating. Hereto, 2 g of beads was placed on a lower horizontal electrode of an electrical circuit. A voltage of 3470 V and 38 MHz was used. The time of exposure was 15–20 seconds. Expansion of the beads with a particle diameter of 1.8–2.5 mm, resulted in a pre-expanded particles with a bulk density as indicated in Table 1.

EXAMPLE 2

Example 1 was repeated with the exception that zeolite Ca-A was replaced by zeolite Y, wherein part of the sodium ions were replaced by $NH_4^+$ ions (hereafter referred to as zeolite $NH_4^+$-Y). The Si/Al ratio of this zeolite was 2.5. The average particle size of the zeolite was 5 μm, as measured in accordance with the laser light diffraction method of Example 1.

During the suspension polymerization, a buffering amount of calcium hydroxide was added in order to maintain the pH of the aqueous phase at about pH 12. The results are shown in Table 1.

EXAMPLE 3

Example 1 was repeated with the exception that zeolite Ca-A was replaced by amorphous silica particles of the type "SIPERNAT 50", which contained 98.5% by weight of $SiO_2$. The average particle size was 39 μm, as measured in accordance with the laser light diffraction method of Example 1. The results are shown in Table 1.

TABLE 1

| Porous Silicate Compound | Added Concentration of Porous Silicate Compound (% wt[1]) | Water Content in Resulting Polystyrene Particle (% wt[2]) | Bulk Density (kg.m³) Pre-expanded Particles |
|---|---|---|---|
| Zeolite Ca-A | 1 | 5.6 | 122 |
| | 2 | 7.4 | 67 |
| | 3 | 9.2 | 65 |
| | 5 | 11.0 | 47 |
| | 10 | 18.7 | 52 |
| Zeolite $NH_4^+$—Y | 1 | 10.6 | 60 |
| SIPERNAT 50 | 1 | 3.6 | 171 |
| | 2 | 5.2 | 81 |
| | 3 | 7.0 | 54 |
| | 5 | 7.5 | 39 |

[1]based on styrene
[2]based on the amount of vinylarene, water and porous silicate compound

EXAMPLE 4

Styrene (3000 g), polystyrene (1000 g), potassium persulphate ("KPS", 120 ppm based on styrene and polystyrene) and silica particles of the type "SIPERNAT 50" (2% wt, based on styrene and polystyrene) were stirred under nitrogen at room temperature. By heating the mixture to 90° C. in 30 minutes, and maintaining this temperature for 60 minutes, styrene was converted by thermal polymerization. Subsequently, the reaction mixture is cooled to 60° C. within 20–30 minutes. The total amount of styrene polymer in the reaction mixture was 30% wt. A solution of 0.3% wt, based on styrene, dibenzoyl peroxide, and 0.2% wt, based on styrene, t-butyl(2-ethylhexyl)peroxycarbonate in 60 g styrene was added and the mixture was homogenized at 60° C. The mixture was subsequently dispersed in 4000 g water with 0.3% wt, based on water, hydroxyethyl cellulose and 0.2% wt, based on water, tricalcium phosphate. The suspension was heated for 240 minutes at 93° C. and 120 minutes at 120° C. to yield complete styrene polymerization.

The water content and silica content of the resulting beads are set out in Table 2. The water content was measured in accordance with the Karl Fischer method. The silica content was measured by weighing 20 g polystyrene particles at room temperature, subjecting these 20 g polystyrene particles to 600° C. until ashes of a constant weight were obtained, and again weighing the ashes at room temperature. For the amount of tricalcium phosphate in the ashes was corrected with a complexometric titration with EDTA.

EXAMPLE 5

Styrene (4000 g), maleic anhydride (0.5% wt based on styrene) and t-butyl(2-ethylhexyl)peroxycarbonate (1 g) were mixed. By heating the mixture to 120° C. in 30 minutes and maintaining this temperature for 60 minutes, styrene is converted. Subsequently, the reaction mixture is cooled to 60° C. within 20–30 minutes. The styrene conversion is about 30%. A solution of 0.3% wt, based on styrene, dibenzoyl peroxide, and 0.2% wt, based on styrene, t-butyl (2-ethylhexyl)peroxycarbonate in 60 g styrene was added and the mixture was homogenized at 60° C. The mixture was subsequently dispersed in 4000 g water. The suspension polymerization was the same as described for Example 4.

The water content and silica content of the resulting particles were measured in accordance with the methods set out for Example 4. The results are set out in Table 2.

EXAMPLE 6

Example 4 was repeated with the exception that no potassium persulphate was added.

The water content and silica content of the resulting particles were measured in accordance with the methods set out for Example 4. The results are set out in Table 2.

TABLE 2

| Example | Silica Content of Final Resulting Particle[1] | Water Content of Resulting Particle[1] |
| --- | --- | --- |
| 4 | 0.48% wt | 3.17% wt |
| 5 | 1.72% wt | 8.32% wt |
| 6 | 0.21% wt | 1.73% wt |

[1]based on the amount of vinylarene, water and porous silicate compound

What is claimed is:

1. Expandable polymer particles containing a polymer of a vinylarene monomer, a porous silicate compound, and water, wherein the porous silicate compound is selected from the group consisting of alumino silicates and amorphous silica particles and the porous silicate compound is incorporated in said polymer in an amount ranging from about 0.1 to about 10% by weight based on the weight of vinylarene, water and porous silicate compound so as to retain said water in said particles in an amount ranging from 1.5% to about 20% by weight based on the weight of vinylarene, water and porous silicate for use of said water as essentially the sole blowing agent in said expandable particles for the production of pre-expanded polymer particles from said expandable particles.

2. Polymer particles according to claim 1, wherein the porous silicate compound is selected from clays and alumino silicate zeolites.

3. Polymer particles according to claim 2, wherein the porous silicate compound is selected from alumino silicate zeolites having a Si/Al ratio of 1 to 30.

4. Polymer particles according to claim 1, wherein the porous silicate compound is selected from amorphous silica particles that are built from more than 95% by weight of $SiO_2$.

5. Polymer particles according to claim 4, wherein the average particle size of the porous silicate compound is 50 $\mu$m or less.

6. Process for the preparation of pre-expanded polymer particles from expandable polymer particles containing a polymer of a vinylarene monomer and water as a blowing agent, which process includes:

(a) preparing a viscous mass containing 10–70% by weight, based on the total amount of vinylarene present, of a polymer of a vinylarene monomer, 90–30% by weight, based on the total amount of vinylarene present, of a vinylarene monomer, and including the incorporation of a porous silicate compound in said viscous mass in an amount ranging from about 0.1 to about 10% by weight based on the weight of vinylarene, water, and porous silicate compound;

(b) suspending the viscous mass thus obtained into an aqueous medium to yield suspended particles;

(c) polymerizing the suspended particles to complete monomer conversion to produce said expandable particles containing said vinylarene, said porous silicate compound incorporated therein, and from 1.5% to about 20% by weight of water, based on the weight of vinylarene, porous silicate compound, and water; and (d) subjecting said expandable particles to a pre-expansion process for said preparation of said pre-expanded polymer particles.

7. Process according to claim 6, wherein the viscous mass of step (a) is obtained by pre-polymerization of vinylarene monomers to a conversion degree of 10 to 70% by weight, based on the weight of the vinylarene monomer present at the start of the polymerization, and adding the porous silicate compound before, during or after the pre-polymerization to the polymerization mixture.

8. Process according to claim 7, wherein potassium persulphate or maleic anhydride is added to the viscous mass.

9. Foamed articles obtainable from the polymer particle as defined in claim 1.

10. Polymer particles according to claim 5, wherein the average particle size of the porous silicate compound incorporated in said polymer ranges from about 0.1 $\mu$m to about 40 $\mu$m.

11. Polymer particles according to claim 10, wherein the average particle size of the porous silicate compound incorporated in said polymer ranges from about 0.5 $\mu$m to about 20 $\mu$m.

* * * * *